United States Patent [19]
Pollock

[11] Patent Number: 5,238,408
[45] Date of Patent: Aug. 24, 1993

[54] ROW OF JOINED ARITHMETIC BLOCKS WITH COMMON WALLS WHICH ARE DOUBLE END WALL THICKNESS

[76] Inventor: Clyde Pollock, 2375 Sueno Way, Fremont, Calif. 94539

[21] Appl. No.: 550,085

[22] Filed: Jul. 9, 1990

[51] Int. Cl.⁵ .................. G09B 1/00; A63H 33/08
[52] U.S. Cl. .................. 434/208; 434/403; 446/124
[58] Field of Search .......... 434/208, 403; 446/87, 446/117, 124, 125, 128, 120, 121

[56] References Cited

U.S. PATENT DOCUMENTS

| | | | |
|---|---|---|---|
| 349,646 | 9/1886 | Grigg | 434/208 X |
| 1,971,545 | 8/1934 | Tompkins . | |
| 2,278,894 | 4/1942 | Paulson | 446/117 |
| 2,440,205 | 4/1948 | McLain | 434/167 |
| 2,972,833 | 2/1961 | La Grutta . | |
| 3,094,792 | 6/1963 | Morgan et al. . | |
| 3,389,493 | 6/1968 | Zysset . | |
| 3,414,986 | 12/1968 | Stassen . | |
| 3,566,531 | 3/1971 | Hasel et al. . | |
| 3,577,671 | 5/1971 | Woollett | 446/124 |
| 3,766,667 | 10/1973 | Glassman . | |
| 4,305,221 | 12/1981 | Chatani . | |

FOREIGN PATENT DOCUMENTS

| | | | |
|---|---|---|---|
| 2162458 | 6/1973 | Fed. Rep. of Germany | 446/124 |
| 2920743 | 12/1980 | Fed. Rep. of Germany | 446/124 |
| 1174646 | 3/1959 | France | 434/208 |
| 1263113 | 4/1961 | France | 434/208 |
| 2239084 | 3/1975 | France | 446/125 |
| 171389 | 10/1982 | Netherlands | 446/124 |
| 14957 | of 1894 | United Kingdom | 446/87 |
| 744850 | 12/1956 | United Kingdom | 434/208 |

Primary Examiner—John J. Wilson
Assistant Examiner—L. Thomas
Attorney, Agent, or Firm—David Pressman

[57] ABSTRACT

Base-ten blocks for teaching arithmetic to children, in which each block (19) has a projecting boss (27) with curved (bowed-out) sides (29) and an aperture (33) with straight sides (35), so that blocks (19) can be securely joined together to form multiples of units. A row of integral blocks (37) has common wall thicknesses (42) between adjacent blocks equal to twice the thickness of the end wall (45) of the row so that the row can be correctly mated with a row of single blocks or end-to-end rows of shorter blocks. Integral rows (37) of ten blocks each have two end bosses (41) for joining to other rows (37) to make flats (47) of one hundred units. Each flat has four bosses (51) for joining to other flats (47) to make a cube of one thousand units. The blocks have one color for units, a different color for rows of tens, a different color for flats of one hundred, and a still different color for cubes of one thousand. The blocks can be used to teach addition, multiplication, subtraction, division, etc., to children.

8 Claims, 4 Drawing Sheets

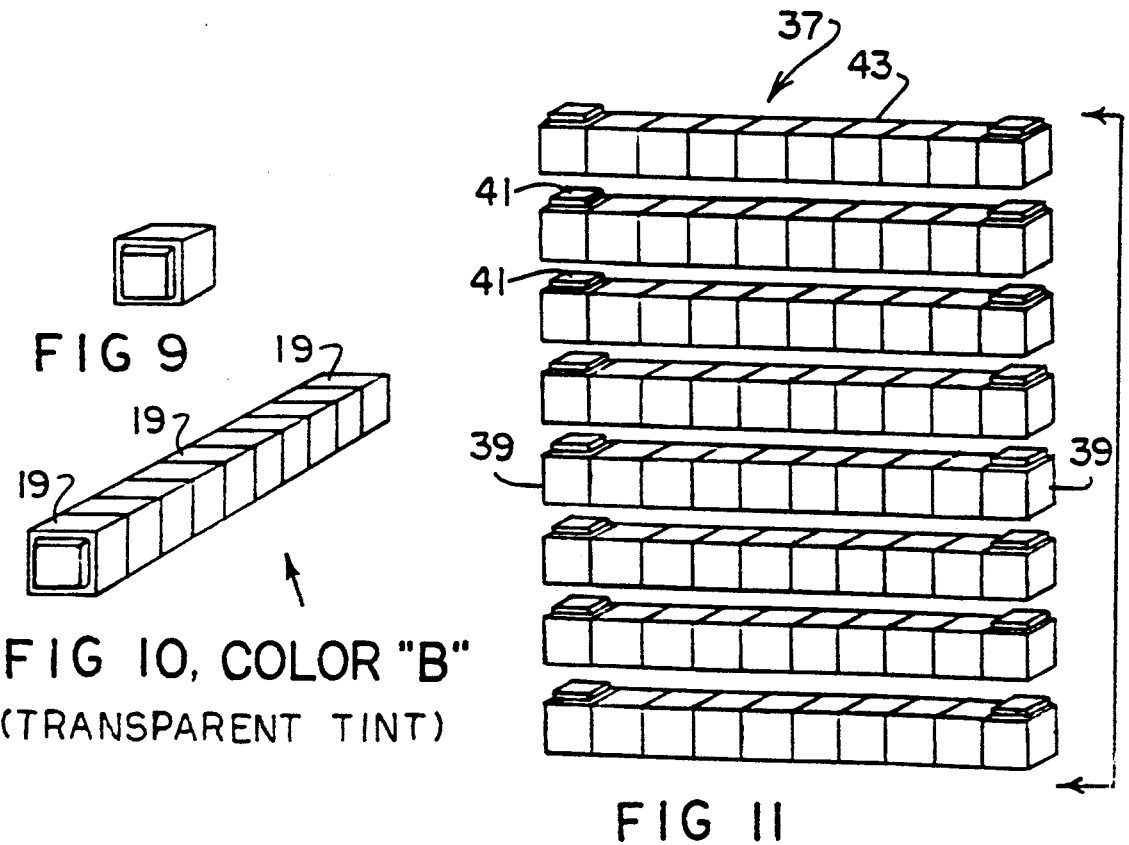

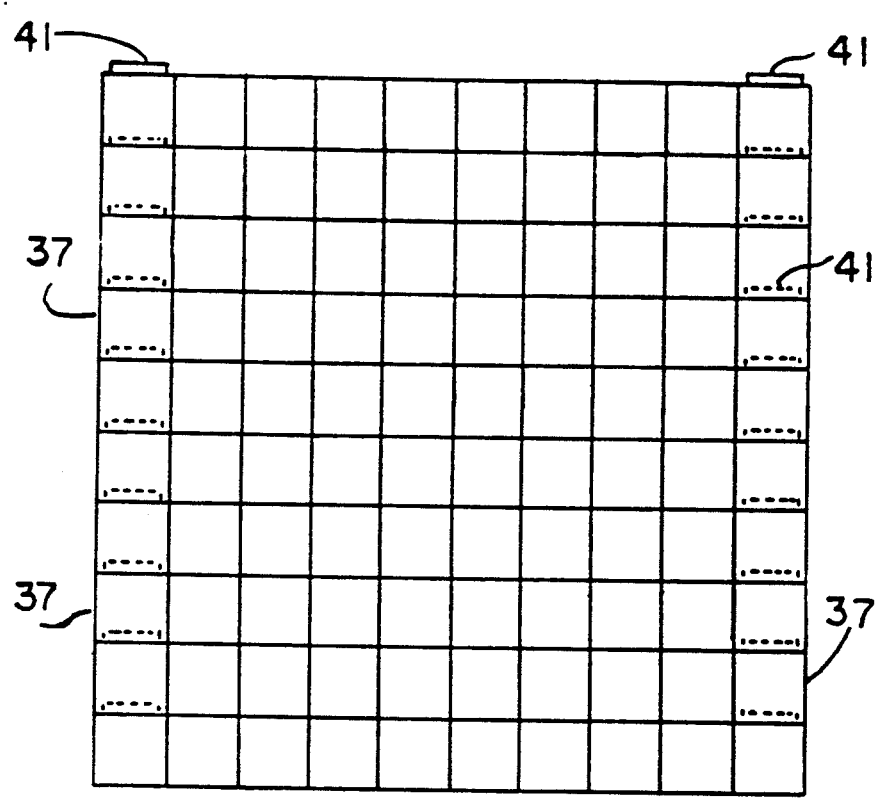
FIG 12. COLOR "C"
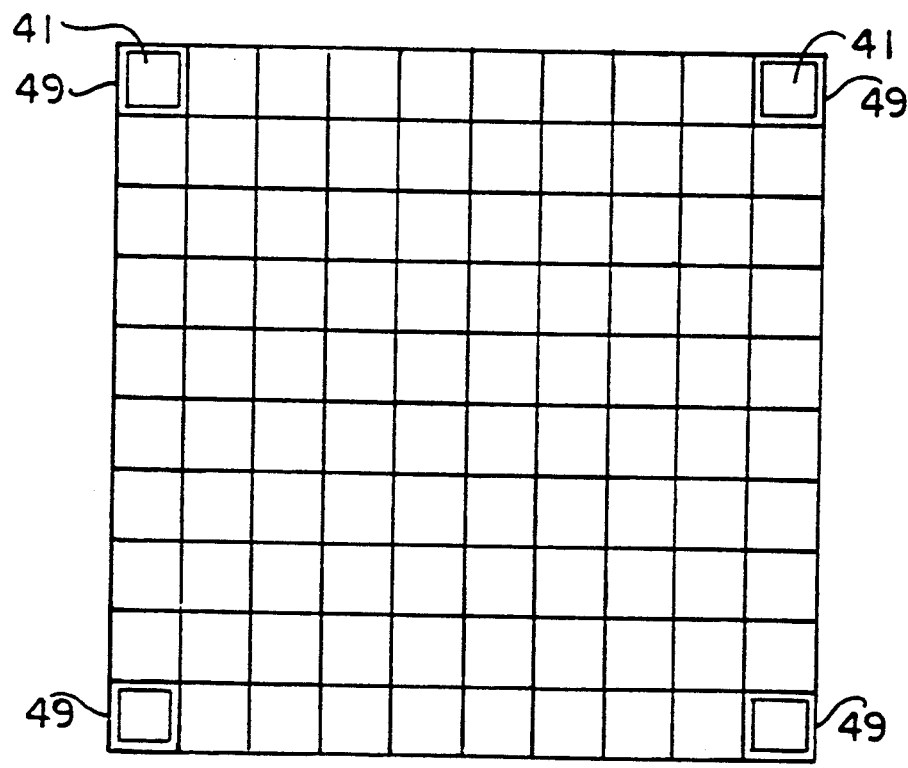
FIG 13

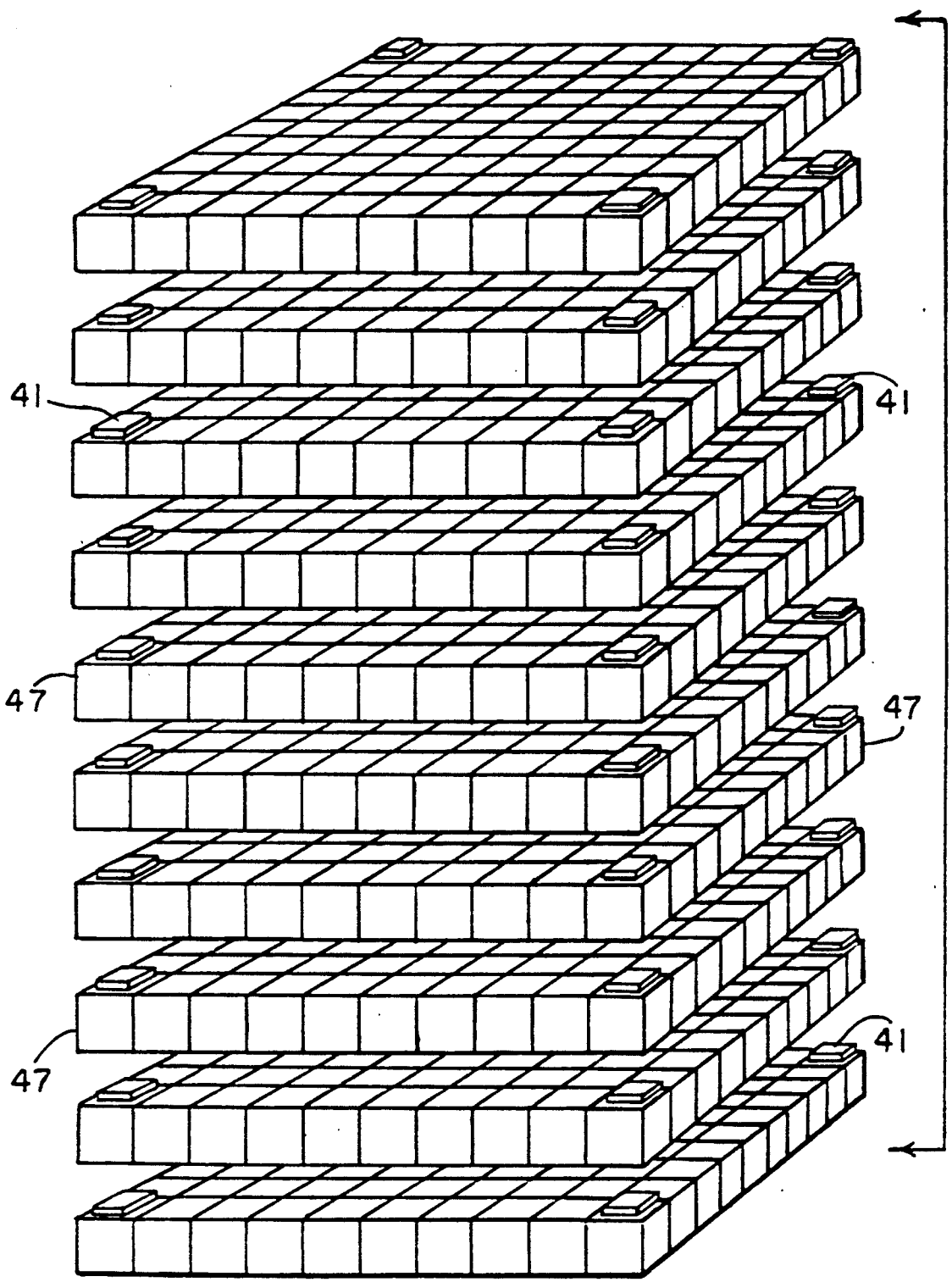
FIG 14, COLOR "D"

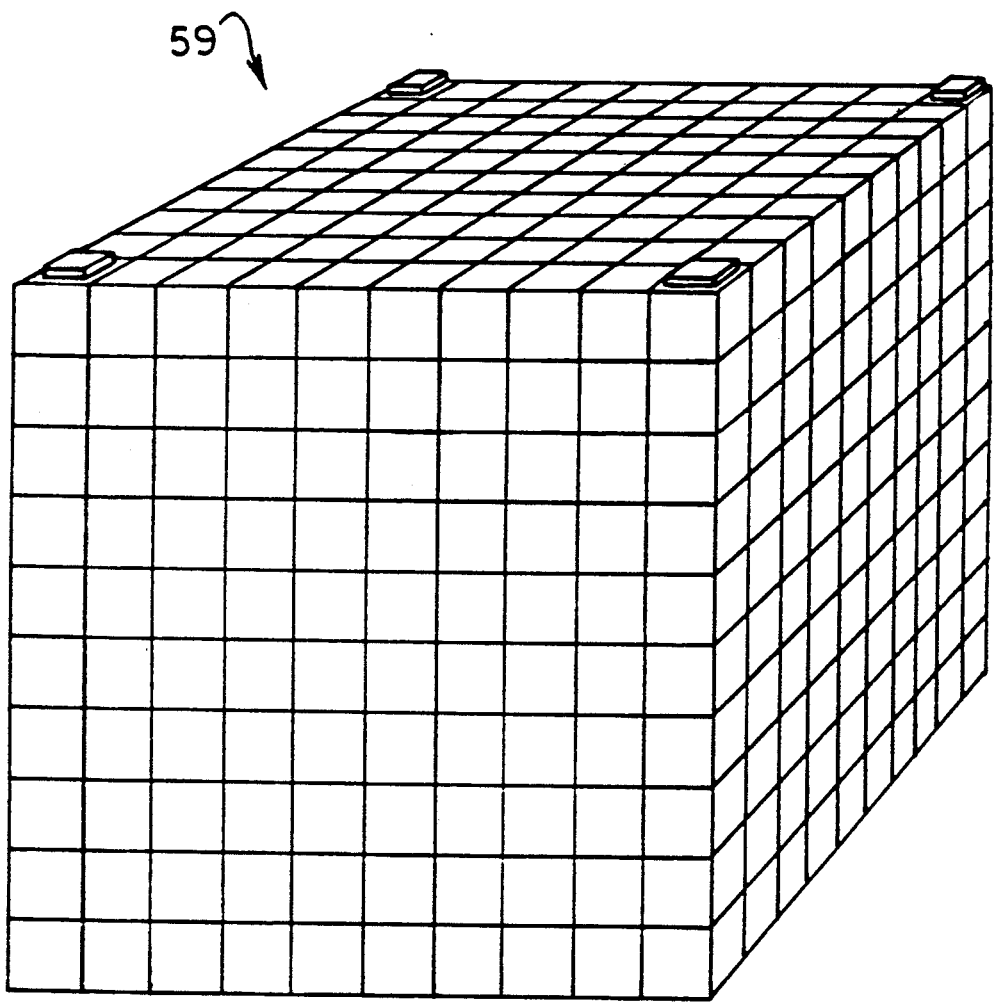
FIG 15 COLOR "D"

ROW OF JOINED ARITHMETIC BLOCKS WITH COMMON WALLS WHICH ARE DOUBLE END WALL THICKNESS

BACKGROUND

1. Field of Invention

The present invention relates to a learning aid, in particular to blocks which can be joined to teach arithmetic to children.

2. Description of Prior Art

In the past, various blocks were used for teaching arithmetic to young children. These blocks were sometimes supplied in multiples of ten and as such were called decimal or base-ten blocks. (Learning the base-ten system is of extreme importance nowadays because virtually all computer systems are designed around such a system.) The blocks were joinable in rows, flats, arrays, cubes etc. The blocks included mating bosses and recesses and other joining means for holding the blocks together so that the child using them could be taught to add, subtract etc., by joining and removing the blocks in such rows, arrays, etc. However, these joining means left much to be desired: they soon wore or came apart easily. This resulted in the blocks frequently falling apart. The children using the blocks thus became frustrated and thus switched their minds from concentrating and learning to reassembling the blocks. Frequently the reassembled blocks fell apart again, further frustrating the child and sometimes reducing the child to tears.

This produced a number of unwanted effects. First the frustrated child lost concentration and missed part of the teacher's instruction. Second, if other children were present, e.g., in a class, they began to notice the frustrated child and became concerned and lost concentration also. This caused the teaching eposode to become a shambles.

An additional problem with base-ten blocks was the difficulty in distinguishing between those blocks representing tens, hundreds, and thousands. This was a serious drawback and handicapped effective teaching and learning, especially where children were concerned.

An additional complicating factor occurred because some blocks were made in different colors, with the colors being jumbled. I.e., individual blocks were made in many colors. While a profusion of colors on a single block might exite and interest a child, such colors detracted from the child's ability to concentrate. Furthermore the blocks had no means for teaching arithmetic.

Some examples of blocks made of rubber plastic or other suitable materials, designed to teach arithmetic to young children, are as follows:

E. E. Tompkins, in U.S. Pat. No. 1,971,545, dated Aug. 28, 1934, shows toy building blocks made of rubber. These, however, fall far short of being suitable for teaching arithmetic because the blocks are imitations of clay bricks and half bricks (bats), such that, although a child might learn basic bricklaying with them, they are unsuited for teaching base-ten arithmetic.

P. La Grutta, in U.S. Pat. No. 2,972,833, dated Feb. 28, 1961, shows a plastic block assembly. However these blocks are again suitable only for building and not for teaching arithmetic.

A French patent, 1,263,113, dated 1961, to Est. Vulliermes, shows interlocking blocks with numbers attached for teaching arithmetic to children. However these blocks do not use or teach the base-ten system.

H. W. and E. E. Morgan, in U.S. Pat. No. 3,094,792, dated Jun. 25, 1963, shows blocks with holes therethrough for assembling onto pegs to show tangible examples of arithmetic to children. However again no reference is made to the base-ten system. Also different colors are suggested for each different unit from one to ten, which tends to confuse a child attempting to learn the base-ten system.

K. Zysset, in U.S. Pat. No. 3,398,493, dated Mar. 24, 1966, shows a building block toy set. However, again no reference is made to the base-ten-blocks, or to teaching arithmetic to children.

H. E. Stassen, in U.S. Pat. No. 3,414,986, dated Dec. 10, 1968, shows a visual aid for arithmetic. Gov. Stassen's system is similiar to that of the French patent, i.e., numbers are placed on blocks representing the number of units involved. Again this system differs from and is unsuitable for teaching the base-ten system.

H. Hasel et al., in U.S. Pat. No. 3,566,531, dated Mar. 2, 1971, shows mating blocks having beaded studs and resilient sidewalls. These building blocks have four mating projections at each half-block end, corresponding to each half-block end of an adjacent block. These projections fit into indents on the inside of the resilient sides of the adjacent block for the purpose of block building. These blocks are similiar to those of the Tomkins patent and are merely models of clay building bricks. While they can be used to teach various bricklaying techniques, they make no reference to and are not suitable for the base-ten system.

Glassman, in U.S. Pat. No. 3,776,667, dated Oct. 23, 1973, shows an educational arithmetic manipulative toy. It employs blocks which have holes drilled in them to fit over pegs attached to other blocks. Again no reference is made to and these blocks are not suitable for the base-ten system.

Y. Chatani, in U.S. Pat. No. 4,305,221, dated Dec. 15, 1981, shows block members having interior interlocking means for use by children in toy block constructions. Again these blocks are similiar to those of Hasel and Tomkins. They provide a model of clay building bricks, perhaps useful in teaching bricklaying, but again no reference is made to any base-ten blocks system for teaching arithmetic.

J. H. Walker, in U.S. Pat. No. 744,850, dated 1956, shows blocks for the education and recreation of children. The blocks have a hole therethrough for passing a cord, if desired. A projection is also provided to fit into a recess in a hollow or solid adjacent cube. No mention is made for any use in base-ten block system.

As stated, none of the references above show base-ten block for teaching arithmetic to young children. Moreover none have any effective, reliable means for holding the blocks together and allowing them to be separated repeatedly. Also none provide any means to facilitate understanding the base-ten system. Also when previous blocks were mated, there was a lack of harmony between single units and integral combinations of units in mixed assemblies of the blocks. I.e., end blocks in multiple rows or arrays of mated blocks often overlapped or did not align properly. Lastly, no means was provided for distinguishing between blocks representing, units, tens, hundreds, and thousands.

OBJECTS AND ADVANTAGES

Accordingly one object and advantage of the present invention is to provide a set of base-ten blocks which fit firmly together and do not fall apart. Other objects are to provide a set of such blocks which can be repeatedly separated and joined without failure, which do not cause children using them frustration and loss of concentration while learning, and which facilitate learning and distinguishing the units, tens, hundreds, and thousands in the base-ten system. Further objects are to provide blocks in colors which will assist in teaching arithmetic in a clear and understandable way to children, to provide a set of such blocks which will snap together in any desired arrangement, and to provide a set of blocks which align when assembled in rows, arrays, etc. Additional objects and advantages are to facilitate teaching children arithmetic, to make it enjoyable, and to provide a comfortable climate where the children's class will stay united in learning. Still further objects and advantages will become apparent from a consideration of the ensuring description, taken in conjunction with the accompanying drawings

BRIEF DESCRIPTION OF DRAWINGS

FIG. 1 is a side view of a single block in accordance with the invention.

FIG. 2 is a top view of the block of FIG. 1.

FIG. 3 is a bottom view of the block of FIG. 1.

FIG. 4 is a side view of two blocks interlocked together.

FIG. 5 is a sectional view taken along the line 5—5 of FIG. 4.

FIG. 6 is a side view of six blocks interlocked together.

FIG. 7 is a side view of a portion of an integral ten-unit row of blocks.

FIG. 8 is a top view of the ten-unit row.

FIG. 9 is a perspective view of a single block.

FIG. 10 is a perspective view of a ten unit row.

FIG. 11 is a perspective exploded view of ten rows.

FIG. 12 is a side view of ten rows assembled to form a flat.

FIG. 13 is a top view of a "flat" (100 blocks).

FIG. 14 is a perspective exploded view of ten flats.

FIG. 15 is a perspective view of ten flats forming a 1000-cube array.

REFERENCE NUMERALS

19: single block
21: side
27: boss
28: lead-in edge
29: curved side
31: corners
33: recess
35: straight sides
37: row
39: end units
41: boss
42: thick wall
43A and 43B: integral units
45: end wall
47: flat
49: corner units
59: 1000 block cube.

DETAILED DESCRIPTION OF SINGLE BLOCK—FIGS. 1-6

FIG. 1 shows a side view of a single block 19 used in the base-ten block or cube system of my invention. Block 19 has four sides 21, each of which measures 1 cm (0.375") by 1 cm square (FIGS. 1–6, 9, and 10). An integral boss or projection 27 extends up from the top of the block. Boss 27 is 8 mm (0.312") wide, 8 mm (0.312") deep and 2 mm (0.125") high, about 1/5 the height of the block, and has slightly curved (bowed-out) sides 29 and rounded lead-in edges 28. Sides 29 bow out about 0.5 mm (0.0312"). Boss 27 also has rounded corners 31 (FIG. 2).

In use, boss 27 is inserted into open end or recess aperture 33 (FIG. 4) in the bottom of an identical block. Sides 35 of open end 33 are straight, as shown clearly in FIG. 3. Thus when boss 27, is inserted into straight sided recess 33, sides 29 and 35 will each distort the total of both distortions will be (about 0.5 mm"), as shown in the sectional view (FIG. 5). This forced distortion forms a vise-like force or interference grip between recess 33 and boss 27 so as to hold the adjacent mated blocks (top to bottom) firmly together. This is because the vise-like grip occurs on all sides of each connection. When a plurality of blocks 19 are joined together (top boss 27 of each being plugged into bottom recess 33 of the next), a row of blocks will be created, as shown in FIGS. 6 and 10. The cubes or blocks of the row will not fall apart during normal handling due to the aforedescribed grip.

Rounded lead-in edges 28 (FIG. 1) of boss 27 facilitate the insertion of boss 27 (with bowed sides 29) into recess 33 (with straight sides 35).

When inserted, bowed sides 29 will distort sides 35, which is made of suitable deformable plastic, or any other suitable material. As the deformation of sides 35 is the means for holding the blocks together when assembled, pressure is required during insertion. However this pressure is easily accomplished by any child old enough to learn arithmetic by the base-ten system.

Single blocks (FIG. 1) preferably are made transparent with a colored tint of a first or "A" color as indicated in FIG. 2. The "A" color may, e.g., be blue, for reasons to be described. The blocks preferably are made of plastic which is slightly deformable.

TEN UNIT ROWS—FIGS. 7, 8, AND 11

Side wall 21 of each of blocks 19 (FIGS. 1–6 and 9) is 2 mm thick. However, when placed side by side with another block, the combined thickness of two such walls 35 is 4 mm. When a plurality of blocks are molded or glued together side-to-side as shown in FIG. 7, a pre-assembled wall will be provided. The wall between adjacent blocks is made of a double or 4 mm thickness. However each end wall is made with a single, or 2 mm, thickness. This will prevent jamming or misalignment problems when two rows, or multiple single blocks placed end-to-end (not shown) are mated with a single, longer pre-assembled row. Also, it will prevent misalignment when a single block 19 (FIG. 1) is plugged into the end block of a row 37 (FIG. 7).

When a row of blocks is molded as shown at 37 (FIGS. 7 or 11), each representing ten units, only the end blocks have a boss 41 and a corresponding bottom recess (not shown). The wall thickness between integral or glued blocks 43A and 43B, shown clearly in FIGS. 7 and 8, is twice the thickness of a unit wall, i.e., 2×2=4 mm. However, as stated, the end wall 45, (FIG. 7, 8, and 11) remains at half this, or a 2 mm thickness.

100-UNIT FLATS—FIG. 13

A flat 47 (FIG. 13) is an integrally molded combination of ten rows 37 (FIG. 12). However, only the four corner blocks 49 have bosses 41 and corresponding recesses (not shown). Again, the wall thickness between adjacent blocks in any row (horizontal or vertical) is twice the wall thickness of the end walls of that row.

1,000-UNIT CUBE—FIG. 16

When ten flats 47 (FIG. 14) are assembled face-to-face as shown in FIG. 15, a 1,000 unit cube 53 is formed.

COLORS OF BLOCKS

Single blocks 19 (FIG. 1) and rows 37 (FIG. 11) preferably are made of transparent plastic tinted different colors, e.g. blue and red (designated "A" and "B" colors in FIGS. 1 and 10).

Flats of 100 blocks (FIG. 12) are made transparent but with a different or "C" tint, e.g. green, light blue, etc. as indicated in FIG. 12. And cubes of 1000 blocks (FIG. 15) are transparent with a still different, or "D" tint, e.g. purple, as indicated.

OPERATION—FIGS. 1-6, 9, AND 10

A child is especially aware of differences in color, and learns colors at home and in pre-school classes. Children enjoy connecting colors to various objects. Children feel happy to connect something they already know with something they are learning, and they thus soon becomes comfortable with the colored blocks.

In operation, the child is taught to assemble units or blocks 19 end-to-end (FIG. 10) until ten are assembled. This elementary operation can be used to teach the child to count. The child can easily be taught to assemble ten blocks by adding blocks to the row until its length equals that of a preassembled row 37 (FIG. 11).

Once the child has learned to count to and assemble a row of ten blocks, he or she can exchange it for preassembled row 37, which has the same value (ten). The row has a different color from the individual blocks so that the child can readily be taught to multiply or add (as well as divide or subtract) by associating multiples of one color with a single unit of another color, e.g. "ten blues equal one red," etc. This enables the child to become familiar with the decimal or base-ten system. Then the child is taught to assemble ten rows 37 (FIG. 11) together, to assemble a flat (not shown) of 100 blocks. The child can be taught to recognize and count to 100 by comparison with preassembled flat 47 (FIG. 13). At the same time the child can be taught basic multiplication and subtraction by visualizing that ten strips of ten equal 100 ($10 \times 10 = 100$ and subtracting rows, e.g., $100 - 10 = 90$.

Once the child assembles a flat of 100 blocks, he or she can exchange it for preassembled flat 47 (FIG. 13) which has the same value. Again, each row of ten should have a different color than the flat, so that the child can learn the multiple color association, e.g. "ten reds equal one green" or "one hundred blues equal one green," etc.

Then the child is taught, in the same manner as before, to assemble ten flats 47 (FIG. 15) to provide an assembled cube; this can then be exchanged for a preassembled cube (FIG. 16), which has the same value (1000 units). Thus the child's knowledge will now have been expanded to understand, count up to, add, and multiply up to 1000.

Each flat of 100 should have a different color from the cube, so that the child can learn the multiple association, e.g. "ten reds equal one purple."

As indicated, this process enables the child to learn the fundamentals of the base-ten system, including the technique of multiplication: $10 \times 1 = 10$, $10 \times 10 = 100$, $10 \times 100 = 1000$, etc. Also the child can be taught subtraction by comparison, take-away strategy, or noting differences, as well as addition by buildingon, and division and multiplication: by building arrays, etc. The color associations and combinations greatly facilitate this process.

In addition, the transparency of the blocks enhances understanding by enabling the child to see through the color of foreground (front or top) blocks to discern the color of rear blocks in any assembly and to easily visualize that additional single blocks, rows of blocks, or flats of blocks are joined behind the foreground blocks to make up the numbered array.

SUMMARY, RAMIFICATIONS AND SCOPE

Thus the reader will see that I have provided a base-ten block system for teaching arithematic to young children. This system has many advantages over prior-art systems. These are: the boss is made with slightly curved sides, so that when inserted into the aperture at the opposite end of another unit which has straight sides, the mating walls will distort so that a very strong clamping force will hold both together. This grip will occur on all four sides between the boss of one block and the aperture of the adjoining unit. This ability to maintain pressure is due to the distortable property of the material used and its ability to remember its original shape (square with straight sides) and to return to that shape after the boss, (which has curved sides) is withdrawn.

The wall thickness of single blocks is 2 mm. However, where multiple blocks are molded integrally together, the wall thickness is increased to 4 mm, so as to correspond in length to multiple single blocks of the same number of units. This prevents jamming when the integral row is mated with a row of single blocks or with two shorter rows are placed end-to-end.

Single blocks are made of one color, rows are made of a different color, flats are made of a third color, and cubes of a fourth color. This provides a valuable association and mnemonic aid during the teaching of arithmetic (addition, subtraction, etc.)

While the above description contains many specificities, the reader should not construe these limitations on the scope of the invention but merely as exemplifications of preferred embodiments thereof. Those skilled in the art will envision that many other possible variations are within its scope. For example skilled artisans will readily be able to change the materials, dimensions and sizes of the various embodiments, such as by making the parts of wood, metal, or rubber, making them larger, smaller, thicker or thinner, or with other colors. The boss can be made longer and its sides can be made with more or less curvature. The blocks can be made opaque, or the boss and aperture can be made octagonal instead of the sides the boss bulging, the inside surfaces of the recess can be convex (bulging in toward the center apex of the block) and the boss sides flat, or both the side surfaces of the boss and recess can be made to bulge, or any combination of the two can be used. While this system has been designed and is very instructive to children, it can also be used to teach arithmetic to adult "innumerates", i.e., adults who are arithmetically illiterate. While the blocks have been shown as being assemblable in the decimal or base-ten system, they can be fabricated according to other numbering systems, such as the quintile, octal, hexadecimal, etc.

Accordingly the reader is requested to determine the scope of the invention by the appended claims and their legal equivalents, and not by the examples which have been given.

I claim:

1. A set of blocks which can be assembled for teaching arithmetic by assembling arrays of such blocks, comprising:

a plurality of blocks which are permanently joined together to form a row of blocks having a direction of elongation, each of said blocks being substantially hollow and having a plurality of side walls, including first and second side walls which face in opposite directions, each adjacent pair of blocks being permanently joined such that said first side wall of one is permanently joined to said second side wall of the other so as to form a common wall, one end of said row comprising a first end block whose first side wall faces away from said row in said direction of elongation of said row, the opposite end of said row comprising a second end block whose second side wall faces away from said row in said direction of elongation of said row and in a direction opposite to the direction in which said first side wall of said first end block faces, said first side wall of said first end block being equal in thickness to said second side wall of said second end block, the thickness of each common wall between each adjacent pair of adjoining blocks being substantially twice the thickness of said first side wall of said first end block and substantially twice the thickness of said second side wall of said second end block, whereby said row can be mated with other blocks without misalignment.

2. The set of blocks of claim 1 wherein said first and second end blocks each have bottom and top surfaces which face in opposite directions from each other and normal to said direction of elongation of said row, said top surface comprising a projection and said bottom surface comprising a recess arranged to mate with a projection of another block, whereby said row may be joined to another similar row of blocks.

3. The set of blocks of claim 2 wherein said recess and said projection each have a plurality of side surfaces which all face in a direction normal to the directions faced by said bottom and top surfaces, said side surfaces of one of said recess and said projection bulging out slightly so that when a recess is mated with a projection, an interference fit will be created.

4. The set of blocks of claim 1 wherein each of said blocks has six sides and is cubical in shape.

5. The set of blocks of claim 2 wherein said projection and said recess of said blocks both have four side surfaces arranged in a square configuration.

6. The set of blocks of claim 1 wherein each of said blocks is transparent.

7. The set of blocks of claim 6 wherein each of said blocks is tinted to have a predetermined color.

8. The set of blocks of claim 1 wherein said first and second end blocks each have bottom and top surfaces which face in opposite directions from each other and normal to said direction of elongation of said row, said top surface comprising a projection and said bottom surface comprising a recess arranged to mate with a projection of another block, whereby said row may be joined to another similar row of blocks, said recess and said projection being symmetrically positioned with respect to said said first and second walls.

* * * * *